UNITED STATES PATENT OFFICE.

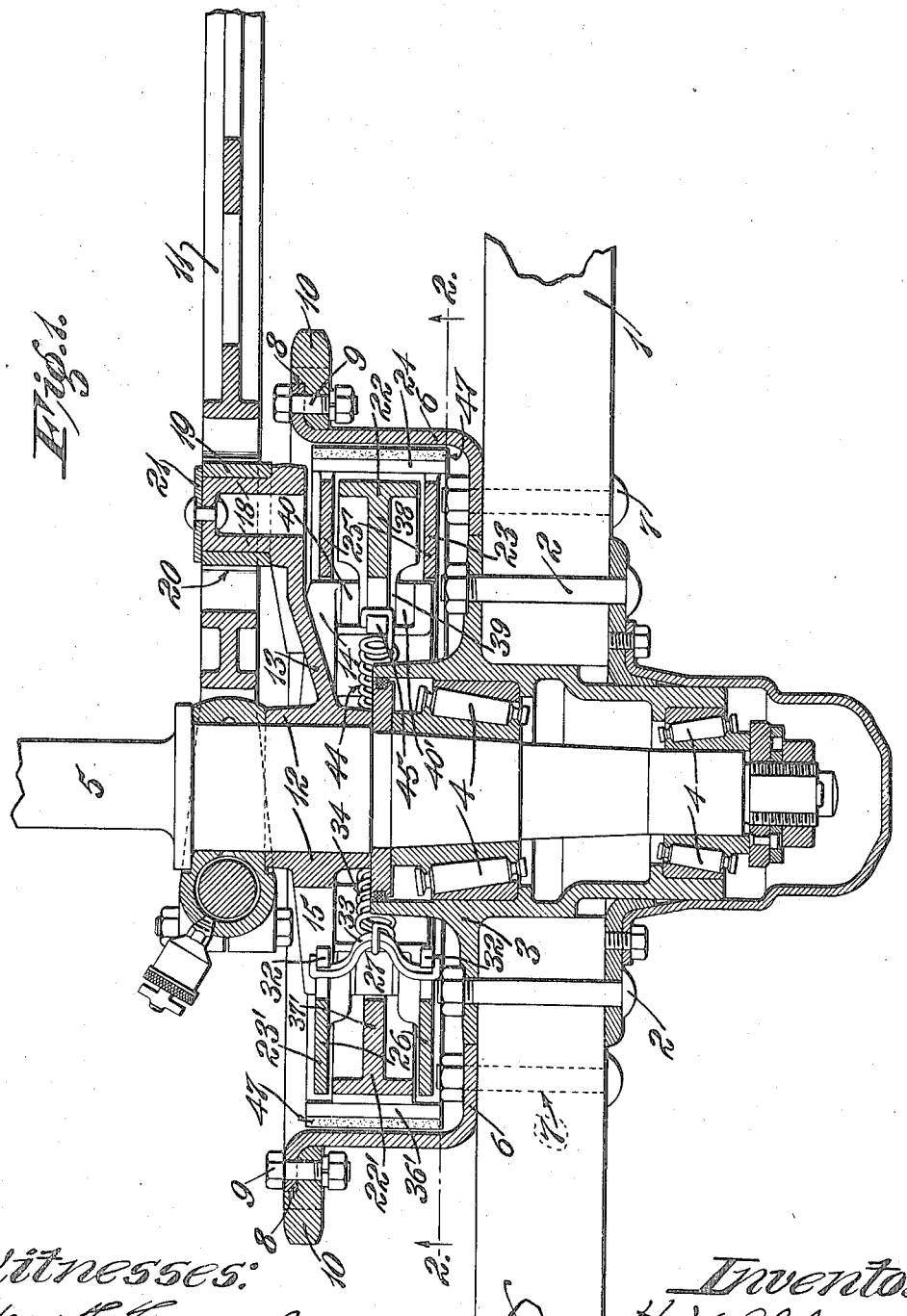

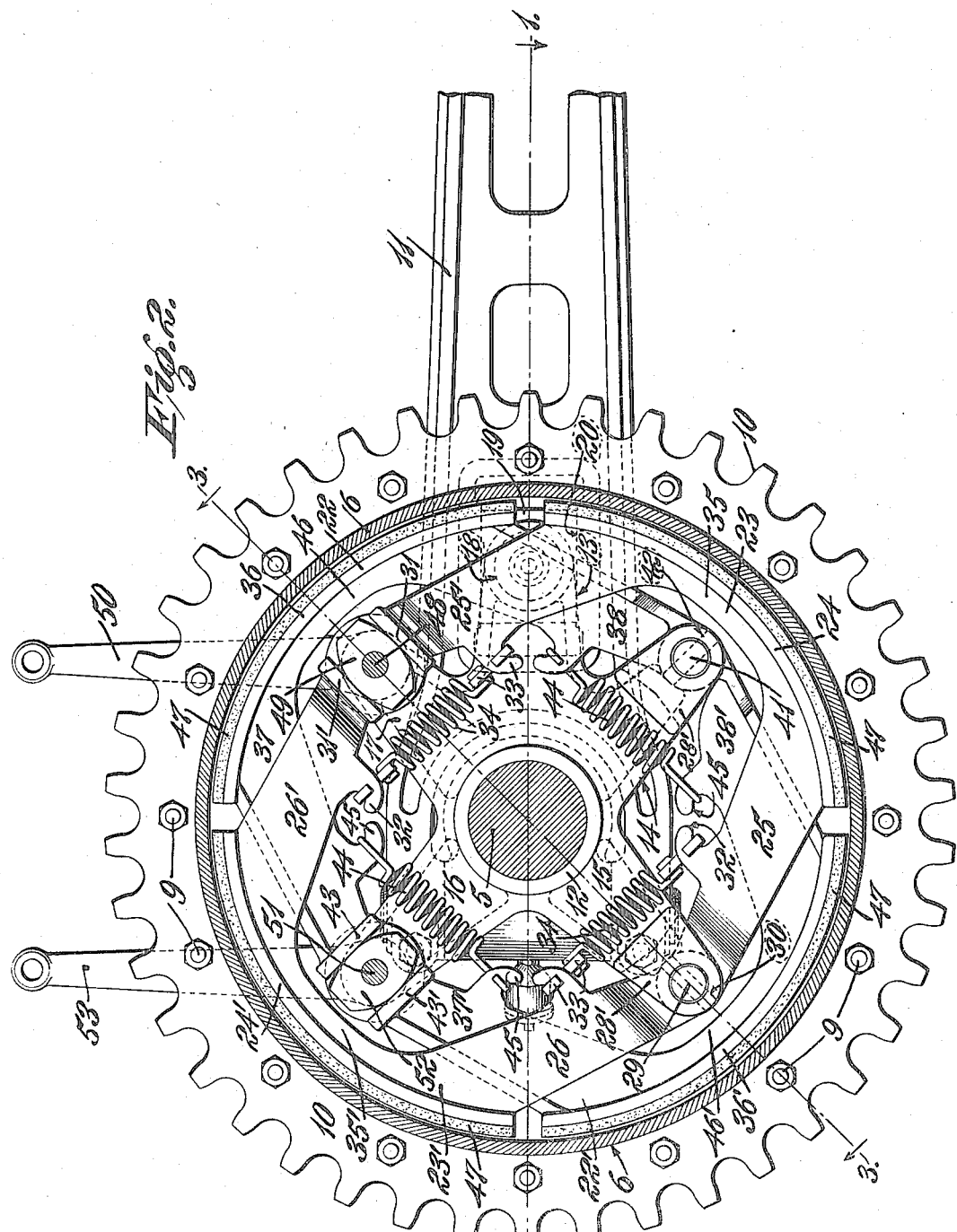

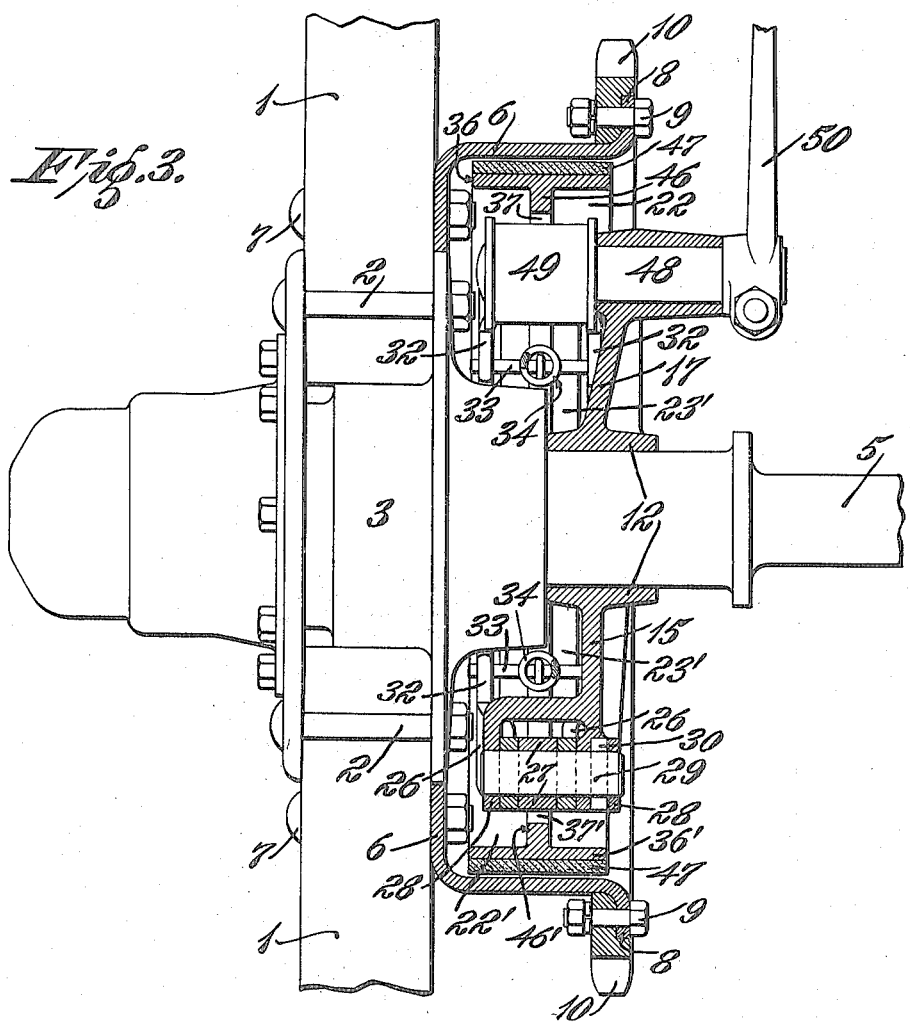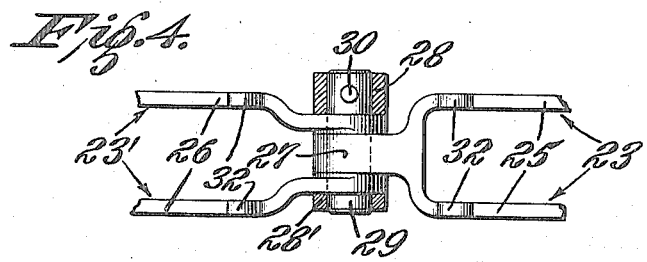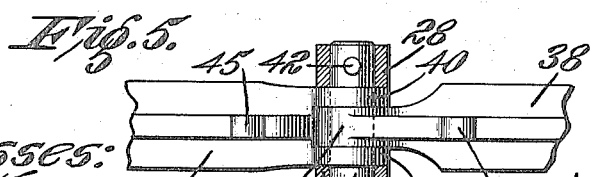

HERBERT W. ALDEN, OF DETROIT, MICHIGAN, ASSIGNOR TO THE TIMKEN-DETROIT AXLE COMPANY, OF DETROIT, MICHIGAN, A CORPORATION OF OHIO.

VEHICLE-BRAKE.

1,135,148.  Specification of Letters Patent.  Patented Apr. 13, 1915.

Application filed January 16, 1914. Serial No. 812,466.

*To all whom it may concern:*

Be it known that I, HERBERT W. ALDEN, a citizen of the United States, and a resident of the city of Detroit, county of Wayne, and State of Michigan, have invented a new and useful Improvement in Vehicle-Brakes, of which the following is a specification.

My invention relates to a friction brake mechanism which is particularly adapted for use on the wheels of motor vehicles, but it is capable of use in other connections.

One of the principal objects of my invention is to obtain the advantages of having two independently operable brake shoes or bands located on the inside of the brake drum without making the brake drum too wide for practical use.

A further object of my invention is to increase the durability of the brake shoes or bands used in vehicle brakes.

A still further object of my invention is to secure an increase of the unit pressure of the brake shoes or bands upon the brake drum without increasing the force of the pull applied to the operating mechanism for the brake shoes or bands and without extending the distance through which this force acts.

Further objects of my invention and advantages resulting from its use will more fully appear hereinafter.

For reasons of safety it is desirable to furnish motor vehicles with two brake mechanisms capable of being operated independently; and this is usually accomplished by providing each of the driving road wheels with two independent brakes acting upon the same brake drum, each brake drum having a brake band engaging the outside face of the drum and another brake band engaging its inside face. This construction is not practically applicable to motor vehicles of the type in which the wheels are driven by sprocket chains, because it is difficult to place brake bands on the outside faces of the drums mounted on the driving wheels on account of interference between the sprocket chains and the anchors for the brake bands. If it is attempted to obviate this objection by placing two independent brake bands, acting upon the inside face of the drum, side by side, it is necessary to make the drum very wide in order to secure adequate braking surface. By the use of my invention, however, it is possible to provide two separate brake bands for motor vehicles without increasing the usual width of the brake drums and without reducing the effective braking surfaces. Generally stated, this result is accomplished in my invention by arranging a number of brake members to operate along substantially the same path on the brake drum and by providing means for actuating said brake members selectively; for example, by using four brake members each having a brake shoe which extends substantially one-fourth of the distance around the inside circumference of the brake drum, and by arranging these shoes so that they act over approximately the same circumferential path on the brake drum and may be operated independently in pairs.

The invention consists in the construction and in the arrangement and combination of parts hereinafter more fully set forth.

In the accompanying drawings, which form part of this specification, and in which like reference characters are used to designate like parts throughout the several views, Figure 1 is a horizontal section of a brake mechanism embodying my invention, showing it applied to a driving wheel of a motor vehicle, the section being taken on the line 1—1 of Fig. 2 and the brake shoes being in the released position; Fig. 2 is a vertical section taken on the line 2—2 of Fig. 1; Fig. 3 is a section taken on the line 3—3 of Fig. 2, the wheel sprockets and hub being shown in elevation; Fig. 4 is a fragmentary detail section showing the pivot mounting of one pair of the brake members; and Fig. 5 is a view similar to Fig. 4 showing the pivot mounting of the other pair of brake members.

For the purpose of illustration, the brake embodying my invention is shown in connection with an automobile running gear of the type disclosed in my Patent No. 1,101,673 June 30, 1914. It is obvious, however, that my invention is not restricted in its use to this particular construction.

The spokes 1 of a driving wheel are fastened by bolts 2 to a hub 3 mounted upon antifriction bearings 4 upon a fixed axle 5. A brake drum 6 is rigidly secured by bolts 7 to the spokes 1. One edge of the brake drum 6 opposite to the spokes 1, which will be termed the inner edge, is formed with a flange 8, to which is rigidly fastened by bolts 9 a sprocket wheel 10. The sprocket wheel 10 is driven by a sprocket chain in the usual manner, and the power thus received is transmitted to the wheel through the spokes 1. A radius rod 11 is swiveled on the axle 5 at one end and is pivotally connected to the frame of the vehicle at its other end, in the manner shown and described in my patent hereinbefore mentioned.

A brake spider 12 is mounted on the axle 5 and is formed with five integral bracket arms 13, 14, 15, 16 and 17, which radiate from its center. The bracket arm 13 extends obliquely out beyond the inner edge of the brake drum 6 and is made with an integral boss 18 upon which is pivoted a square block 19. The square block 19 slides in a slot 20 in the radius rod 11. The block 19 is held in position on the boss 18 by a cap plate 21 riveted to the boss. The bracket arm 13 and the boss 18 form an anchor for the brake spider 12 and serve to resist the torque of braking.

Mounted on the bracket arms 14 and 15 are two pairs of brake members 22, 22', 23, 23'. The brake members of each pair are similar in construction. The brake member 23 is provided with a brake shoe 24 and has two pairs of spaced arms 25 and 25, and 25' and 25', integral with the brake shoe 24. The brake member 23' is provided with a brake shoe 24' and has two pairs of spaced arms 26 and 26, and 26' and 26', integral with the brake shoe 24'. Arms 25 and 25 of the brake member 23 converge together at their free ends to form an integral bearing head 27, and the arms 26 and 26 of the brake member 23' are drawn together slightly and embrace the opposite faces of the bearing head 27. The bracket arm 15 is bifurcated at its end to form lugs 28 and 28', and the arms 25 and 25, and 26 and 26, of the brake members 23 and 23' are pivotally secured to said lugs 28 and 28' by a pin 29, secured in place by a pin 30. The arms 25' and 25', and the arms 26' and 26', of the brake members 23 and 23' terminate in blocks 31 and 31' respectively, each of which has a flat bearing surface. All of the arms of the brake members 23 and 23' are each formed with integral hooks 32, and a stirrup 33 is engaged over the hooks of each pair of arms. Coil springs 34 are connected between each pair of opposite stirrups 33 and serve to hold the brake shoes 24 and 24' out of engagement with the inside surface of the brake drum 6 when the brake is in the released position. The brake shoes 24 and 24' are strengthened by ribs 35 and 35' respectively, extended along their backs.

Each of the brake members 22 and 22' has a brake shoe 36 and 36' respectively, and two arms 37 and 38, and 37' and 38' respectively. The arm 38 is cut away at its free end to form a head 39, and the arm 38' is cut away at its free end and slotted to form spaced lugs 40 and 40' which embrace the head 39. The bracket arm 14 is bifurcated to receive the spaced lugs 40 and 40', and the brake members 22 and 22' are pivotally connected to the bracket arm 14 by a pin 41 which passes through the head 39 and the spaced lugs 40 and 40', and is held in place by a pin 42. The arms 37 and 37' of the brake members 22 and 22' terminate in blocks 43 and 43' respectively, each of which has a flat bearing surface. Coil springs 44 are connected to hooks 45 formed on the arms 37 and 37', and 38 and 38' of the brake members 22 and 22' and serve to hold the brake shoes 36 and 36' out of engagement with the inside surface of the brake drum 6 when the brake is in its released position. The brake shoes 36 and 36' are strengthened by ribs 46 and 46' respectively, extended along their backs. The brake shoes 24 and 24', and 36 and 36', are faced with any suitable form of brake lining 47.

Journaled in the bracket arm 17 is a rock shaft 48 carrying at one of its ends a cam 49 engaging the faces of the blocks 31 and 31', and at the other of its ends a brake lever 50. Journaled on the bracket arm 16 is a similar rock shaft 51 carrying at one of its ends a cam 52 engaging the faces of the blocks 43 and 43', and at the other of its ends a brake lever 53.

In the operation of the device, when a pull is applied to the brake lever 50, which is connected in any desired manner to either a hand or a foot lever, the cam 49 is rocked and spreads apart the blocks 31 and 31'. The brake members 23 and 23' are thus rocked on the pin 29 and the linings 47 of the brake shoes 24 and 24' are pressed tightly against the inside surface of the brake drum 6 to produce the braking action. After the braking has been accomplished and the pull upon the brake lever 50 is released, the coil springs 34 act to pull the brake members 23 and 23' away from the inside surface of the brake drum and bring the brake linings 47 out of contact with this surface. The operation of the brake members 22 and 22' by a pull upon the brake lever 53 is the same.

In a brake constructed according to this invention, the brake shoes are subjected to more uniform wear than the brake shoes of internal brakes of the usual type, because the pressure of the different parts of the brake shoes upon the brake drum when the brake is applied is more uniform. This is due to the fact that the body of a brake shoe, which bears against the brake drum, is located at such a distance from the point about which the brake shoe pivots, that all the parts of this body move relatively to the brake drum very nearly the same distance, when the brake is applied. In an internal brake of the type generally used, however, the brake shoe extends about one-half of the distance around the inside circumference of the brake drum, is hinged at one end, and is applied by a cam acting upon the other end. In this type, it can be seen that the part of the brake shoe, which is adjacent to the hinged end, is moved, when the brake is applied, toward the brake drum a very small distance compared to the distance which the parts near the middle of the shoe move; and it is apparent that the wear on the shoe will not be uniform, and the brake lining will wear down at the middle of the brake shoe and will have to be replaced before the hinged end has appreciably worn. In other words, a brake shoe which is pivoted on an axis located at a distance from one end thereof and which extends approximately one-fourth of the distance around the circumference of the brake drum, will have more uniform wear, and will wear as long before relining as a brake shoe which extends one-half of the distance around the circumference of the brake drum.

Also, the brake shoe of a short length, which is used in this invention, has the advantage that the unit pressure upon the brake drum, where the same amount of force is applied at the cam, will be higher than in the case of a long brake shoe. The pressure upon the brake drum of the short brake shoe used in this invention is nearly uniform throughout its length, whereas in practice the pressure of a long brake shoe pivoted at one end varies throughout its length, and is small throughout a considerable portion of its length. Another advantage of this invention is that less movement of the brake shoe is required to produce the necessary clearance at all points between it and the brake drum for the release position of the brake than is required for a long brake shoe pivoted at one end, and when the brake is applied this clearance is taken up by a small movement of the cam end, and the remainder of available movement at the cam end is effectively used to force the brake shoe against the brake drum.

Obviously, my invention is capable of considerable modification, and therefore I do not wish to be limited to the particular form shown and described.

What I claim is:

1. The combination of a brake drum, brake members operating along substantially the same circumferential path on said brake drum, and means for selectively operating said brake members.

2. In a vehicle brake, a hollow brake drum, two pairs of brake members, each of said brake members having a segmental brake shoe, each of said shoes extending substantially one-fourth of the distance around the inside circumferential surface of said brake drum, said brake shoes lying in substantially the same plane, and means for independently operating said pairs of brake members.

3. In a vehicle brake, a hollow brake drum, two pairs of brake members, each of said brake members having a segmental brake shoe extending substantially one-fourth of the distance around the inside circumferential surface of said brake drum and spaced between the ends of the other brake members, and means for independently operating said pairs of brake members.

4. In a vehicle brake, a hollow brake drum, brake members operating along substantially the same path on the inside circumferential surface of said brake drum, and means for operating said brake members separately in pairs.

5. In a vehicle brake, a brake drum and brake members arranged to coöperate therewith, the paths of movement of said brake members on said brake drum overlapping, means for operating some of said members and separate means for operating other members independently.

6. In a vehicle brake, a hollow brake drum, brake members, each of said brake members having a brake shoe coöperating with the inside circumferential surface of said drum, each of said brake shoes extending substantially the full width of the inside circumferential surface of said drum, and means for operating said brake members separately in pairs.

7. In a vehicle brake, a hollow brake drum, a brake spider, two pairs of brake members, each of said brake members comprising a segmental shoe extending substantially one-fourth of the distance around the inside circumferential surface of said brake drum, the brake shoes of the respective pairs of brake members being arranged in alternation at diametrically opposite points with reference to said brake drum, means for pivoting said members to said spider and means for independently operating said pairs of members.

8. In a vehicle brake, a hollow brake drum, two pairs of brake members operating along substantially the same circumferential path on said brake drum, each of said members having a pivoted arm and an actuating arm, the arms of the adjacent brake members being arranged in different planes, and means engaging said actuating arms for operating said pairs of brake members independently of each other.

9. In a vehicle brake, a hollow brake drum, a brake spider, two pairs of brake members coöperating with said brake drum, a pivot connecting each pair of brake members to said spider, and means for independently operating said pairs of brake members, each of said brake members having a segmental brake shoe extending substantially one-fourth of the distance around the inside circumferential surface of said brake drum, the brake shoes of the respective pairs of brake members being arranged in alternation around said drum.

10. In a vehicle brake, a brake drum, two pairs of brake members, a pair of spaced arms on each of the brake members of one of said pairs, an arm on each of the brake members of the other of said pairs adapted to move between the spaced arms on the members of said first-named pair, said brake members operating along substantially the same circumferential path on said brake drum.

11. In a vehicle brake, a hollow brake drum, two pairs of brake members operating along substantially the same path on the inside circumferential surface of said brake drum, each of said brake members having a shoe which extends substantially one-fourth of the distance around the inside circumferential surface of said brake drum, each pair of brake members having their shoes disposed diametrically opposite to each other with reference to the center of said brake drum, and a cam for simultaneously operating the brake members of each pair, said cams being independently operable.

12. In a vehicle brake, a hollow brake drum, a sprocket wheel secured to said brake drum, two pairs of brakes operating along substantially the same path on the inside circumferential surface of said brake drum, and means for operating said pairs of brakes independently.

13. In a vehicle brake, a brake drum, two pairs of brake members, each having a segmental shoe operating along substantially the same circumferential path on said brake drum, the brake members of one pair each having two parallel arms projecting outwardly from each end of the shoe thereof, the brake members of the other pair each having an arm projecting outwardly from each end of the shoe thereof, each of said last-mentioned arms lying between two of said first-mentioned arms, and means for operating each pair of brake members independently of the other pair.

14. The combination with a brake drum and a brake spider, of two pairs of brake members arranged within said drum substantially in circumferential alinement, said pairs of brake members being respectively pivotally connected to said brake spider on diameters of said drum which are at right angles to each other, each of said brake members having a friction surface disposed with the middle thereof on the diameter of said brake drum upon which the brake members of the other pair are pivoted, and means for operating said pairs of brake members selectively.

15. The combination with a brake drum and a brake spider, of two pairs of brake members coöperating with said drum, each of said brake members having a pivot arm pivotally connected at its outer extremity to said brake spider and an operating arm with its outer extremity located approximately diametrically opposite to the pivot axis of said pivot arm, each of said brake members having a brake shoe subtending an arc of about ninety degrees between the extremities of said pivot arm and said operating arm and being located equidistant therefrom, said brake shoes of said brake members being arranged end to end circumferentially within the drum, and means for selectively operating said pairs of brake members.

Signed at Detroit, Michigan, this 13th day of January, 1914.

HERBERT W. ALDEN.

Witnesses:
W. F. WILSON,
LESLIE WILLIAMS.